Oct. 11, 1966 T. P. HARPER 3,278,685
WAVE ANALYZING SYSTEM
Filed Dec. 31, 1962 3 Sheets-Sheet 1

*INVENTOR.*
THOMAS P. HARPER
BY
*John J. McCormack*
ATTORNEY

0
United States Patent Office 3,278,685
Patented Oct. 11, 1966

3,278,685
WAVE ANALYZING SYSTEM
Thomas P. Harper, San Jose, Calif., assignor to International Business Machines Corporation, New York, N.Y., a corporation of New York
Filed Dec. 31, 1962, Ser. No. 248,367
8 Claims. (Cl. 179—1)

The present invention relates to a wave analyzing system, and more particularly, to analyzing means for measuring and comparing the slope reversal and zero crossing characteristics of an acoustical wave.

The art of wave analysis has extremely broad application in today's technology and, hence, is of high interest to a wide variety of workers in the manifold and varying arts which employ systems for analyzing and detecting transduced electrical waves. It is often useful to count the number of slope reversals in such waves. This can indicate such things as a single change of state or a single time period for a detection component. Further, it is commonly useful to measure zero crossings of a transduced wave; i.e., the number of instances wherein a particular slope reversal traverses a reference axis. This gives a quantitative value (amplitude selection) to certain of the slope reversals and allows one to measure the quality, as opposed to the mere number, of slope reversals. Having made these two measurements, it is often advantageous to further obtain a comparison of the two by finding the ratio of reversals to zero crossings. Such a parameter can assist in distinguishing closely similar waves such as waves that have a similar number of slope reversals alone or zero crossings alone, but differ in the ratio of both. In this way, a third piece of information can be found by comparing, "ANDing," the first two values and may be used to distinguish and to analyze closely similar wave forms. The present invention is directed to these problems of wave analysis and offers new and improved means for conveniently, and digitally, measuring both slope reversals and zero crossings and presenting them in classified form to an "ANDing" means.

One form of wave analysis which is most apt for this type of detection and measurement is wave analysis for voice recognition. Many acoustical sounds representative of audio information (words) are distinguishable according to their slope reversal and zero crossing characteristics and may be further distinguished by the ratio between these two. Hence, my invention has particular application in this environment and has particular advantages for the speech recognition types of wave analysis.

Prior art wave analyzing means can accomplish this analysis but does so according to the "analog approach," measuring slope reversals and/or zero crossings according to an analog voltage or current output, the magnitude of which is representative of the number of said slope reversals or zero crossings. There is an incurable defect in such an approach which does not inhere in the digital approach of the invention, namely, an inherent limit of discrimination. It will be evident from a consideration of the analog philosophy that an analog representation, for instance of slope reversals, is in-limit of the determining analog. Such an analog might comprise a scaled voltage output. Thus, the analog measurement may be compared to a ruler having coded increments thereon, the separation of which is inherently limited to a given minimum separation. By contrast, however, digital measurement is not so limited, providing a separate ruler for each small increment, the number of which is virtually infinite. FIG. 1 offers an example comparing this analog problem and the digital approach of my invention.

Output waves A and B in FIG. 1, representing the analog sum of slope reversals (A) and zero crossings (B), respectively, illustrate this inherent disadvantage of intrinsic limitation in measurement resolution. This limitation is shown as $VS_1$ and $VS_2$, representative of the analog differences between successive pulses, measuring, respectively, successive slope reversals and zero crossings. It should be obvious that mere amplification of the analog output wave cannot affect a useful resolution since there are limitations of scale-range because the practical voltage or current ranges are limited. Further, the analog method will not allow one to choose his own ranges or ratios of values, as these are built into the wave which is analyzed. Mere amplification of a fuzzy separation between signals gives only amplified fuzziness with no more inherent clarity; the fuzziness being due, for example, to noise or various undesired subharmonics. Hence, we can say, in summation, that there are inherent limitations in signal separation when analog signals are used to represent wave characteristics (e.g., $VS_1$ and $VS_2$).

These limitations do not inhere in digital output detection, as represented by the instant invention. In FIG. 1, waves A' and B' are trains of digital output signals, representative of slope reversals and zero crossings, respectively. In this case, the signal difference levels ($VS_3$ and $VS_4$) may be chosen as large as you please for readout convenience, since the differences are not inherent in the readout wave, as in the analog case above. Furthermore, the quantity measured is entirely different since it is not the value of the pulses but merely the time duration (period) thereof. For instance, by comparison with the analog method, if the density of slope reversals up to point $x$ in FIG. 1 were to be detected, then this would be a summed voltage, $Vx$, according to the analog technique; while it would be represented by a time $Tx$ according to the digital technique, this time reflecting the density of reversals of amplitude $VS_3$. Two defects in the analog mode appear from this comparison. One is the resolution difficulty, namely, the difficulty in separating a voltage $Vx$ from a closely similar voltage $Vy$ at nearby sample point $y$, a problem not built into the digital method which, once a suitable base is chosen, merely measures time differences. If time is an inconvenient base, one may otherwise measure the number of pulses of $VS_3$ magnitude at that point. The other difficulty, aside from resolution, is the problem of cumulative, continuing error which is built into the analog signal which is a continuum of values unlike a discrete digital output. Since the analog signal (for instance Wave A) is a cumulative one, any error at any point along the system will be reflected in all values read out from that point onward and, further, small errors will tend to accumulate into larger errors. This defect obviously does not inhere in the digital method wherein the signals are not cumulative, but discrete, independent measurements.

Hence, it is an object of the present invention to analyze slope reversals and zero crossings digitally. It is also an object of the invention to analyze slope reversal and zero crossing characteristics of waves and display them as a digital ratio.

Yet another object of the invention is to recognize the speech parameters of slope reversal and zero crossings according to the frequency characteristics thereof for various code sounds.

Still another object is to recognize zero crossing and slope reversal speech characteristics according to the time constant of each of the coded voicing sounds passed by a transistor switching circuit.

A still further object is to recognize slope reversal and zero crossing wave characteristics according to the natural period thereof in a digital fashion.

Still another object is to recognize the wave characteristics of slope reversal and zero crossing for particular code sounds using transistor switching means having a natural switching period within the range of the natural period of the said characteristics.

The foregoing and other objects, features and advantages of the invention will become apparent in the following more particular description of a preferred embodiment of the invention, as illustrated in the accompanying drawings wherein.

Figure 2:
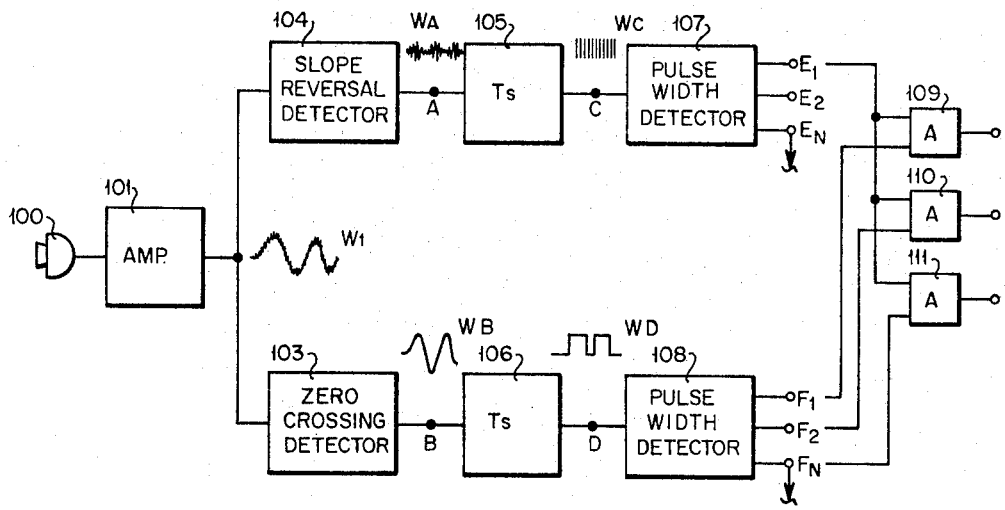
FIG. 2 is a block diagram showing a system for digitally analyzing both slope reversals and zero crossings and digitally comparing the two at the sampled frequencies.

In FIG. 2 there is shown a block diagram illustration of how one embodiment of the digital pulse width detection concept of the invention may be employed in a spech recognition system. Typical of most speech recognition systems, a microphone 100 and an amplifier 101 are used to produce a suitable electrical wave representative of the spech to be analyzed ($W_1$). This wave $W_1$ is sent down parallel detecting lines to slope reversal detector 104 and zero crossing detector 103. It may be noted that a particularly apt slope-reversal detector for this application is the one shown in FIG. 3.

Figure 5:
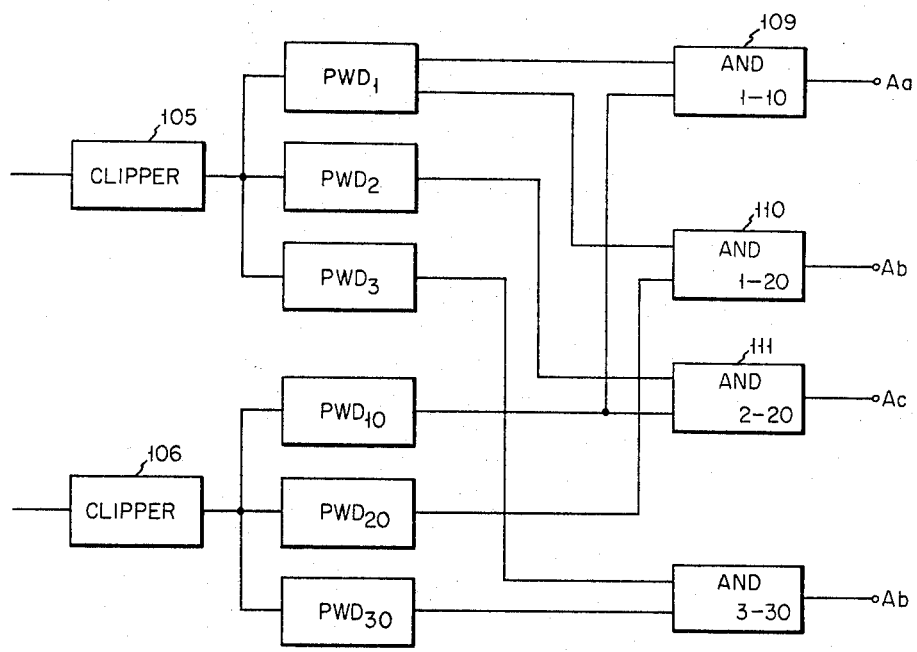
FIG. 5 shows schematically a combination of pulse width detectors as "ANDed"

As noted above, the function of the slope reversal detector 104 is simply to cause any reversal in direction of the input wave to cross a known reference level so that it may be detected and measured. Hence, an output pulse train, ($W_a$) will emanate from 104 and will represent the number of slope reversals. This signal is then passed through a wave normalizing means 105. This could constitute a conventional Schmitt trigger circuit for clipping waves, i.e., squaring the wave shapes and normalizing their amplitude, as shown by the squared waves ($W_c$). At this point, a pulse width detector means 107 produces a digital representation of the number of slope reversals by simply measuring the width, i.e., period of successive pulses in the input wave train $W_c$. This width is inversely proportional to the frequency of each of the pulses ($T \sim 1/f$) since the duration of each pulse is determined by the frequency of the input wave form (assumed constant for each sound). The frequency of this wave train $W_c$ may be shown at the output means separately. This detector means 107 comprises N switching circuits, one for each code-sound and, hence, will have N outputs $E_1$, $E_2 \ldots E_n$ to cover the frequency (period) range of each voiced-sound detected. For instance, if, in a particular application, it is known that the voiced sounds to be detected will exhibit slope reversal frequencies of 250–300, 350–400 and 450–500 cycles, i.e., three code-voicing sounds, then 3 digital output positions $E_1$, $E_2$ and $E_3$ would be provided, each with a switching circuit of the prescribed period. FIG. 5 shows such circuits and they are described below. Each output represents a given frequency range and hence a given range of slope reversal densities. One advantage over an analog indication of slope reversals is that it is highly unlikely that the output signal value will appear ambiguous since only one detector may be up at one time and any detector will either be on or off. Further, the output signal level of each detector may be chosen independent of any other. This also means that, since this is a digital output, it may be recorded or transmitted in binary fashion (e.g., to a computer) without requiring any conversion means.

Figure 6:
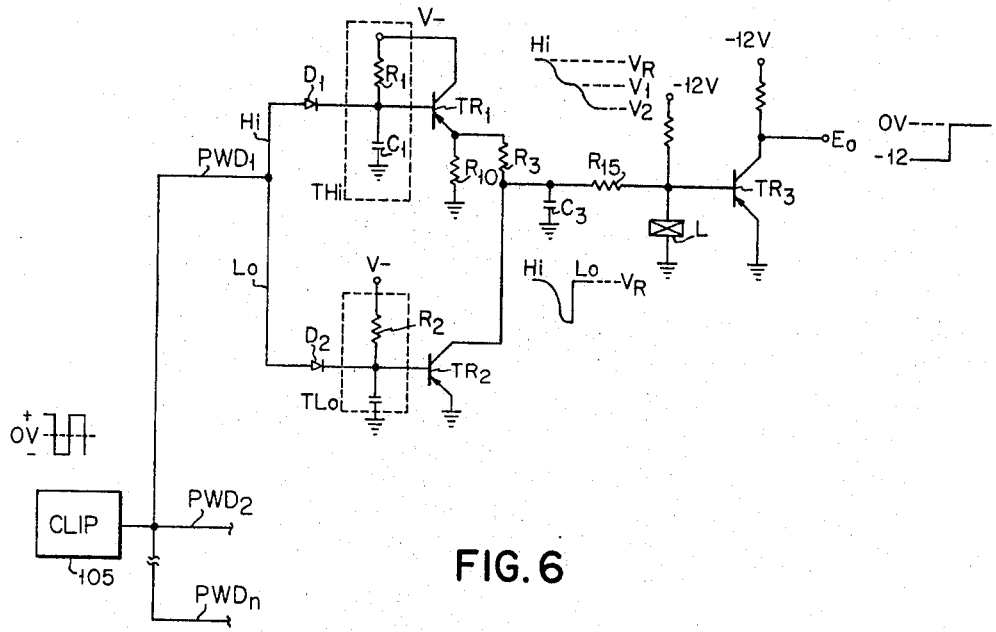
FIG. 6 shows particularly the pulse width detector means of FIG. 2.

The number of zero crossings is measured in a similar fashion. Zero crossing detector 103 produces an output pulse each time the input wave form $W_1$ crosses a reference amplitude. A convenient amplitude often chosen is zero-voltage, or ground, and hence the detector is generally called a zero crossing detector. However, the reference amplitude need not be zero and any suitable level may be chosen. A very satisfactory zero crossing detector is a modified Miller integrator circuit such as shown in FIG. 6, described below. Thus, the wave output from detector 103 will be a train of wave pulses ($W_b$), one pulse for each reference crossing detected. Wave normalizing means 106, such as a Schmitt trigger like that of normalizer 105, is used so as to produce a train of pulses $W_d$ having a rectified normalized amplitude. Pulse width detector 108, like detector 107, then analyzes the width of wave train $W_d$ and, since this is proportional to the number of pulses therein (zero crossing frequencies), provides a digitalized output pulse representative of a particular zero crossing density having the same time constant as one of the switching circuits (see FIG. 5) associated with one of the digital outputs $F_1$, $F_2 \ldots F_n$. The time constants of these switching circuits are chosen to match the zero crossing frequencies of the code-words, one switch for each word. The output signal levels may be chosen arbitrarily for convenience.

Typical of the switching circuits neded for each code word is that shown in FIG. 6. Two such circuits are provided for each code sound—one matching its zero crossing density, the other its slope reversal density.

The arrangement of these switching circuits or individual pulse width detectors (PWD$_{1 \ldots n}$) comprising the overall pulse width detector combinations 107 and 108 are shown schematically in ANDed (ratio) form in FIG. 5. In this schematic system, it is presumed that four code sounds represented by outputs $A_a$, $A_b$, $A_c$ and $A_d$ are presumed to be sufficient to form the speech recognition function of the combination. Each of these sounds will have a particular and characteristic, not necessarily unique, slope reversal density (i.e., the number of slope reversals per second) and zero crossing density (i.e., the number of zero crossings per second). This means that they will, in turn, have a characteristic slope-reversal-period and zero-crossing-period of particular time durations. These time durations have been numbered 1, 2, 3 (slope reversals) and 10, 20 and 30 (zero crossings). Their ANDed combination, therefore, may be coded as follows:

*Table 1*

| Sound Code: | Time-Period (SR–ZC) Code |
|---|---|
| $A_a$ | 1, 10 |
| $A_b$ | 1, 20 |
| $A_c$ | 2, 20 |
| $A_d$ | 3, 30 | wherein for a particular coded sound, for instance $A_a$, the particular slope reversal and zero crossing time periods characteristic of that sound are coded numerically, for instance 1 and 10, respectively, for sound $A_a$. This may be seen to correspond to the numerical designation to the several ANDing circuits in FIG. 5. These circuits generate an output pulse ($A_a$, $A_b$, $A_c$, $A_d$) only upon receipt of an output from both of two characteristic switching or pulse width detector circuits (PWD₁, ₂, and ₃, etc.)

Figure 1:
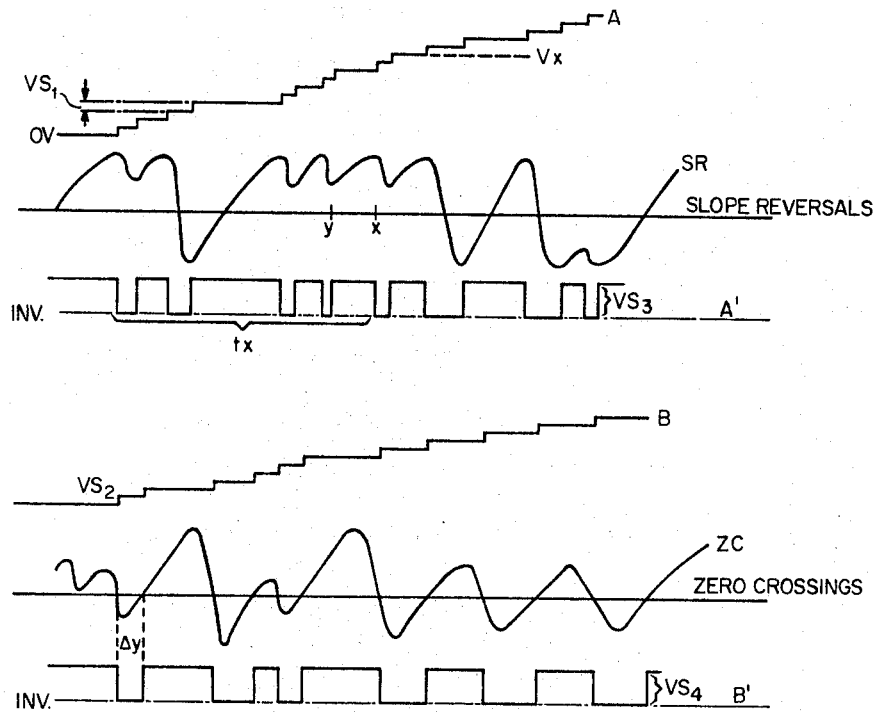
FIG. 1 is a comparative representation of the wave forms to be analyzed, together with the output signal of the invention compared in each case with that of the prior art.

Switching circuits $PWD_1$, $PWD_2$ and $PWD_3$ are set at the time constant characteristic of the slope reversal frequency characteristic of each of the several sounds. Similarly, switching circuits $PWD_{10}$, $PWD_{20}$, and $PWD_{30}$ have the same time constants as the zero crossing densities peculiar to these enunciated sounds. It may be noted that in FIG. 1, $PWD_{1,\,2\text{ and }3}$ comprise means 107, while 10, 20 and 30 comprise 108. Each of the pulse width detector circuits may take the form of the switching transistor circuit shown in FIG. 6 described below in detail.

The transistorized switching circuit shown in FIG. 6 is intended to perform selective slope reversal identification according to a selective switching characteristic whereby only pulses of a predetermined period-range (slope reversal range) will be indicated at the output $E_o$. One switching circuit would be provided for each different period-range to be detected. These time periods are chosen by the switching transistor $TR_1$ and must fall, both above a given adjustable minimum time period and below the adjustable maximum time period. The minimum time constant is made adjustable according to the time constant of R–C input to the base of $TR_1$, comprising Resistor $R_1$ and Capacitor $C_1$, both adjustable. The maximum of the time period is made adjustable according to the activation-time of switching transistor $TR_2$, which time, in turn, is likewise adjustable according to the R–C combination means $R_2$ and $C_2$. Transistors $TR_1$ and $TR_2$ are both of the PNP type. Thus, components $R_1$ and $C_1$ determine a minimum pulse time acceptable (minimum slope reversal density) while components $R_2$ and $C_2$ determine the maximum pulse time acceptable (maximum slope reversal density). The way in which they perform this function may be illustrated as follows:

The normalized input wave pulse is presented through the pulse width detector $PWD_1$ of FIG. 6, as it is likewise presented to all the other zero crossing pulse width detectors $PWD_2$ and $PWD_n$. It has been normalized by clipping means 105 (cf. FIG. 2). Passing through isolating diode $D_1$, the pulse would be presented to R–C circuit $R_1$, $C_1$. The time constant of this circuit will establish a rise time or activation time for switching transistor $TR_1$ which is biased above ground at voltage V—. Transistor $TR_1$ then presents a negative going pulse (cf. wave shape: $V_r$, $V_1$) to load resistor $R_3$ and thence to the integrating capacitor $C_3$, which stores it. The time constant of $R_1$–$C_1$ will establish the minimum pulse time acceptable to the switching system. Transistor $TR_2$, in combination with Resistor $R_2$ and Capacitor $C_2$ is arranged to have a relatively long rise-time in comparison to the high side (Hi) of the circuit so that it will present a positive-going pulse to capacitor $C_3$, if, and only if, it receives a relatively long-period pulse on its input diode $D_2$; in which case it will present its positive-going pulse at capacitor $C_3$, to substantially nullify the negative-going pulse. This is illustrated by the "Hi-Lo" wave combination shown below capacitor $C_3$. If, however, no such long pulse is received, but rather a second (or subsequent) higher frequency pulse is received, $TR_1$ will, in turn, switch this pulse through presenting it to capacitor $C_3$ adding it to the prior Hi-frequency signals already stored there. This is represented by the "Hi-Hi" wave form shown above capacitor $C_3$.

In this manner, a series of negative-going pulses will be built up upon capacitor $C_3$ which, according to choice, will serve, at some point, to fire the latch (L) which, in turn, will switch output transistor $TR_3$ and present a —12-volt pulse at the output $E_o$. This output pulse, of course, signifies the positive identification of slope reversal pulses of a given time duration and this, in turn, is indicative of a particular sound. Latch L may comprise, for instance, a 1-MA tunnel diode of conventional type while output switching transistor $TR_3$ is also a PNP type. Thus, the output load $R_3$–$C_3$ requires that two or more pulses (according to choice) have been accepted and not destroyed by any low frequency output from transistor $TR_2$ before the latch L can be fired and any output signal seen at $E_{o1}$. This relatively simple and accurate transistor switching circuit is duplicated for each one of the selected slope reversal time periods characteristic of the selected code sounds. Similar switching circuits are also provided at the output of clipper 106 comprising pulse width detector circuits 108 for zero crossing detection. These time periods are usually unique but may be duplicated for given words, as for instance, output $A_a$ and $A_b$ in FIG. 5, indicative of two different sounds having a constant slope reversal period detected by $PWD_1$. This illustrates the value of zero crossing detection, for instance by $PWD_{10}$ and $PWD_{20}$ to discriminate between such similar sounds. It should be apparent to those skilled in the art that such relatively simple pulse width detector switching circuits produce digital output signals to be sent to the logic circuitry, all of which are at a standard convenient voltage level such that it is not necessary for these analyzing means to make complex amplitude decisions at low voltage levels.

As will be apparent to those skilled in the art, it is possible, alternatively, to the above arrangement, to dispense with the logic (AND circuitry) and, instead, merely scan the pulse width detector outputs (cf. $E_1$, $E_2$ . . . $E_n$ and $F_1$, $F_2$ . . . $F_n$) of FIG. 2 to yield a numeric answer representative both of the slope reversal-zero crossing ratio, as well as the frequency of occurrence thereof. It is apparent also that the system would still have advantages over the prior art even in such a form since the detector outputs could be amplitude-coded into any arbitrary pattern. Furthermore, the double-information feature would still be kept since the "characteristic frequency" information could be separately displayed from the "ratio-information".

Of course, only the ratios anticipated need be provided for corresponding to each different time constant detected and thus only a few circuits would be required, dependent upon the number of syllables to be identified. For example, for a simple "one" through "ten" speech recognition machine, a minimum of 3 and a maximum of 5 voiced sounds would have to be recognized, involving less than a dozen such switching circuits. Likewise, the advantages over analog systems are maintained in these digital switching circuits since the measurements are made at a nominal-level pulse with fast rise and fall times.

Figure 3:
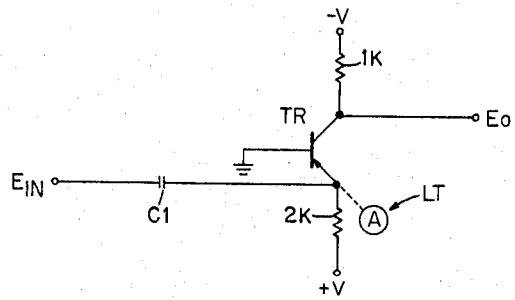
FIG. 3 is a schematic circuit showing of a slope reversal detector, having particular utility in the combination shown in FIG. 2.

In FIG. 3 there is illustrated a slope reversal detector having particular utility in the combination shown in FIG. 2 (cf. detector 104). The measurement of slope reversals consists in detecting when the wave form analyzed crosses a given reference level and generating a pulse each time this happens. This is the function of the circuit in FIG. 3, using transistor TR. The method in which the circuit does this is novel. The transistor used is of the PNP type connected as a common-base amplifier. The principle of operation is one of differentiation and is based upon the maintenance of a constant-current-sum to the transistor; namely, that the sum of the collector currents, base current and emitter currents must be a constant. A rise in input voltage $E_{in}$ will provide an additive amount of current at node A and a consequent rise in output voltage $E_o$. For a drop in input voltage the reverse will happen; namely, a drop in output voltage, this drop constituting a differentiation; i.e., a change of amplitude proportional to the rate of change of input voltage. The output pulse width represents the duration of input change (i.e., input pulse period T, $T = 1/f$). The recommended circuit conditions have been found to be the following:

Collector and emitter supply voltage plus V and minus V, is about 12 volts making the reference level of $E_o$ about $-6$ volts, the collector reference point. $E_o$ should be suitable to drive an amplifier and/or Schmitt trigger. Resistor 1K should be about 1000 ohms and 2K about 2000 ohms, while the capacitor $C_1$ should be about 0.01 microfarads. The PNP transistors TR may be IBM Type 033 or any similar audio transistor. It has been found in practice that the operation of this detector will be such that the current through node A will maintain a constant 6 MA.

Figure 4:
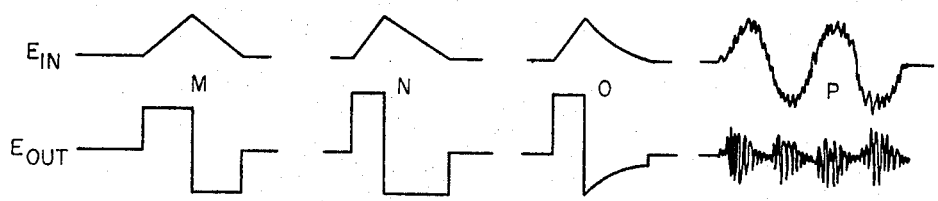
FIG. 4 is a showing of sample output pulses from the detector in FIG. 3.

Turning to FIG. 4, there is shown the output differentiated wave forms produced by the slope reversal detector in FIG. 3. The comparison has been made for four states, labeled M, N, O, and P. In state M, for instance, $E_o$ would be a differentiation of $E_n$ and assume a given amplitude, its duration being that of the change in $E_1$, reversing when the slope of $E_n$ reverses. Comparison with state N will illustrate how the amplitude of $E_o$ changes proportionally with the slope of $E_n$. State O indicates the effect of non-linear change in input voltage and state P shows how a typical voicing input wave ($E_n$ represents the "EE" sound) appears when the slope reversals have been differentiated (at $E_o$).

Figure 7:
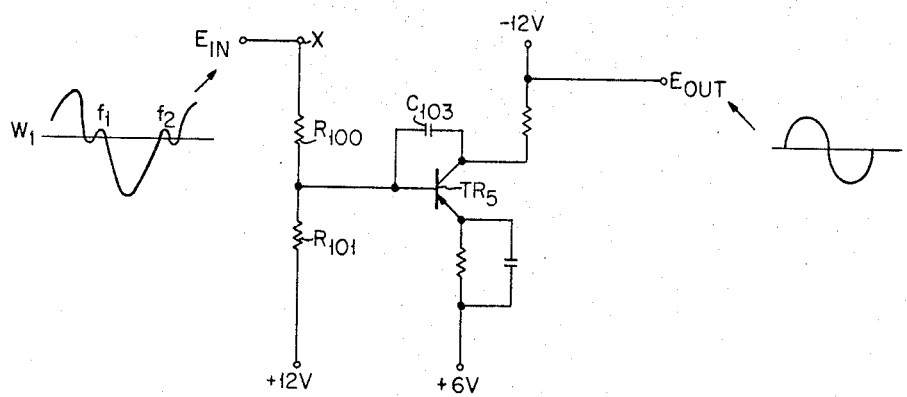
FIG. 7 shows particularly a zero crossing detector circuit for use with the system of FIG. 2

In FIG. 7 there is shown a zero crossing detector circuit (cf. 103 in FIG. 2) which comprises a modified Miller integrator. This circuit has an inherent zero voltage reference level, kept in performing in its integrating function, and it also strips undesirable high frequency components such as $F_1$ and $F_2$ in the sample wave form. Both features are very desirable characteristics, since voltage reference is necessary and the presence of high frequency components can give a false indication of zero crossings. The latter is illustrated by peaks $F_1$, $F_2$ on the sample wave form. After the integration is performed, however, these false zero crossings disappear, leaving a smooth low frequency component remaining. As shown in FIG. 7, the amplified input wave $W_1$ appears at node X and is presented to the base of a PNP transistor $TR_5$ through a voltage divider $R_{100}$-$R_{101}$ comprising, respectively, 5.6K and 16K ohms. Transistor $TR_5$ may be of the 2N270 type and is bypassed between collector and base by capacitor $C_{103}$ of about 0.02 mic.

While the particular embodiments of the invention shown above illustrate its application to speech recognition techniques, it will be evident to those skilled in the art that the present inventive wave analyzing system has application for other problems. In the broad sense, the inventive combination constitutes a means for digitally detecting slope reversals for any wave form according to the pulse width detection technique with a similar detection of zero crossings. The digital output representative of these two values may be easily and conveniently displayed in digital form. These values are typically compared to one another for a slope reversal to zero crossing ratio. The invention can do this without losing the identity of the frequency band within which this measurement is taken, unlike the prior art. In addition to the speech recognition embodiments described hereinbefore, the invention could be applied for wave analysis in ranging systems such as sonar systems wherein discrimination between similar sounding acoustic pulses is a problem that is now left to the skill of the operator. Digital detection of these pulses could automate this function and increase its accuracy. Other similar wave analyzing environments for advantageously applying the invention will suggest themselves to those skilled in the art.

While there has been described above and shown in the drawings various systems and methods for analyzing wave forms, and thereby recognizing spoken syllables in accordance with the invention, it is apparent that various elements and steps may be modified or completely supplanted by the use or substitution of other known elements or arrangements of components. Accordingly, the invention should be considered to include all modifications, variations and alternative forms falling within the scope of the appended claims.

I claim:
1. A wave analyzing system for presenting the slope reversal to zero crossing ratio of a transduced speech wave for speech recognition purposes, including:
   slope reversal detection means;
   zero crossing detection means;
   wave input means connecting the inputs of said detection means; and, at the outputs of said detection means, respectively;
   slope reversal pulse width detection means including digital output terminals, and
   zero crossing pulse width detection means including digital output terminals; and
   digital logic means connected to said digital output terminals and having a plurality of outputs for detecting particular combinations of digital outputs from said digital output terminals and providing a signal on a different output in response to each different combination.

2. A wave analyzing system comprising:
   slope reversal detector means;
   pulse width detector means connected to said reversal detector means at the output thereof, said pulse width detector means being of the digital type and including scaled output terminal means;
   zero crossing detector means connected in parallel with said slope reversal and pulse width detector means and including
   a second pulse width detector means of the digital type and including scaled output terminal means; and
   ratio measuring means for presenting the outputs of the slope reversal and zero crossing detector means in a compared ratio form and at a given frequency band, being connected at the output of said first and second width detector means.

3. In a speech recognition system wherein particular useful vowel sounds are detected for identification of selected code-words, an improved voicing detector means comprising:
   input amplifier means;
   a plurality of output ANDing means;
   slope reversal detector means connecting said amplifier means and said ANDing means, and including a plurality of reversal-frequency detector circuits for each different reversal-frequency to be detected, each of said circuits being arranged to pass pulses of a given period only, said periods being representative of the slope reversal periods of said code words; and in parallel therewith
   zero crossing detector means including a plurality of zero crossing switching circuits, each of which is arranged to switch pulses of certain periods only, said periods being representative of the zero crossing periods of said code words.

4. The combination as recited in claim 3 wherein each of said slope reversal detector means includes:
   a solid state differentiating device having a base, an emitter and a collector, said emitter being capacitively coupled to an input terminal and resistively coupled to a first supply voltage, and said collector being resistively coupled to a second supply voltage of opposite polarity to said first supply voltage.

5. The combination as recited in claim 4 wherein said zero crossing detector means includes:
   integrating means for deleting the high frequency components from the input pulse whereby the false zero crossings caused thereby may be eliminated.

6. The combination as recited in claim 3 wherein said switching circuits comprise:
   a switching transistor means for passing a first signal;
   minimum-period filter means connected between the input of said transistor and said wave input amplifier means;

charge-summing means connected at the output of said switching transistor;

long-period de-switching means connected between said output of said switching transistor and said input to present thereto a second signal nullifying said first signal upon detection of pulses having periods greater than a prescribed maximum; and a voltage output generation means connected at the output of said summing means.

7. The combination as recited in claim 6 wherein said de-switching means comprises a second transistor for passing said second nullifying signal and maximum-period filter means connected between said amplifier means and said second transistor whereby said nullifying signal will be generated only after the maximum detection period, in a given detection range, has elapsed.

8. A wave analyzing system for presenting the slope reversal to zero crossing ratio of a transduced speech wave for speech recognition purposes, including:

slope reversal detection means;

zero crossing detection means comprising solid state differentiation means, the output of which is proportional to the polarity and the value of rate of change of signal input;

wave input means connecting the inputs of said detection means;

at the outputs of said detection means, respectively:

slope reversal pulse width detection means including digital output terminals, and zero crossing pulse width detection means including digital output terminals; and digital logic means for detecting the energization separately of said terminals and comparing them.

References Cited by the Examiner
UNITED STATES PATENTS 3,094,586   6/1963   Dersch _____ 179—1

KATHLEEN H. CLAFFY, *Primary Examiner.*

R. MURRAY, *Assistant Examiner.*

UNITED STATES PATENT OFFICE
CERTIFICATE OF CORRECTION

Patent No. 3,278,685　　　　　　　　　Dated　October 11, 1966

Inventor(s)　Thomas P. Harper

It is certified that error appears in the above-identified patent and that said Letters Patent are hereby corrected as shown below:

Column 1, after line 62, insert -- herently limited in discrimination to the resolution --.

Signed and sealed this 13th day of July 1971.

(SEAL)
Attest:

EDWARD M. FLETCHER, JR.　　　　　　WILLIAM E. SCHUYLER, JR.
Attesting Officer　　　　　　　　　　Commissioner of Patents